(12) United States Patent
Gilad et al.

(10) Patent No.: US 12,162,098 B2
(45) Date of Patent: Dec. 10, 2024

(54) ORBITAL WELDING OF PIPES AND PIPE SEGMENTS

(71) Applicants: WELDOBOT LTD., Eyal (IL); CHEMO AHARON LTD., Tel Aviv (IL)

(72) Inventors: Menachem Gilad, Sde Warburg (IL); Omer Einav, Kfar Monash (IL); Gadi Binyamini, Hagar (IL); Tal Stein, Tel Aviv (IL); Mufeed Hamdan, Isfiay (IL); Alfonso Rubin, Moshav Ofer Hof Carmel (IL); Tamir Ben David, Tel Aviv (IL)

(73) Assignees: WELDOBOT LTD., Eyal (IL); CHEMO AHARON LTD., Tel Aviv (IL)

( * ) Notice: Subject to any disclaimer, the term of this patent is extended or adjusted under 35 U.S.C. 154(b) by 774 days.

(21) Appl. No.: 17/359,575

(22) Filed: Jun. 27, 2021

(65) Prior Publication Data

US 2021/0402500 A1 Dec. 30, 2021

Related U.S. Application Data

(60) Provisional application No. 63/044,362, filed on Jun. 26, 2020.

(51) Int. Cl.
*B23K 9/028* (2006.01)
*B23K 9/00* (2006.01)
(Continued)

(52) U.S. Cl.
CPC .......... *B23K 9/0286* (2013.01); *B23K 9/0026* (2013.01); *B23K 9/0953* (2013.01);
(Continued)

(58) Field of Classification Search
CPC ...... B23K 9/16; B23K 9/0956; B23K 9/0953; B23K 9/0026; B23K 9/0286; B23K 9/235;
(Continued)

(56) References Cited

U.S. PATENT DOCUMENTS 4,144,992 A 3/1979 Omae et al.
2015/0298238 A1* 10/2015 Van Rensburg ..... B23K 9/0286
219/137.31
(Continued)

FOREIGN PATENT DOCUMENTS

AU 2012203693 C1 7/2011
CN 201841353 U 5/2011
(Continued)

*Primary Examiner* — Brian W Jennison
(74) *Attorney, Agent, or Firm* — The Roy Gross Law Firm, LLC; Roy Gross

(57) ABSTRACT

The invention is an apparatus and method for Orbital welding of pipes or pipe segments together to form a pipeline, i.e., Orbital welding. A scanner welding unit, a control unit and a welding unit are combined to travel along and above a seam, which is formed between two interfacing base/cylindrical surfaces of every two pipe or pipe segments, scan the pipes/pipe segments relative positioning, alignment and levelling, and their surface geometry and topography and overlay a welding material starting from the root layer at the bottom of the seam and up to its edge and sealing it with a capping layer. The welding unit lowers a welding tip into the seam that may rotate on its axis at different angels relative to the surface during welding. The scanner unit may alert on mismatches on the relative position of the pipes/pipe segments before or after welding and in some cases enable repositioning for a more hermetically sealed weld.

20 Claims, 6 Drawing Sheets

(51) Int. Cl.
*B23K 9/095* (2006.01)
*B23K 9/16* (2006.01)
*B23K 31/12* (2006.01)
*B23K 101/06* (2006.01)
*G06T 7/00* (2017.01)
*G06T 7/40* (2017.01)
*G06T 7/50* (2017.01)
*G06T 7/60* (2017.01)

(52) U.S. Cl.
CPC ............. *B23K 9/0956* (2013.01); *B23K 9/16* (2013.01); *B23K 31/125* (2013.01); *G06T 7/0004* (2013.01); *G06T 7/40* (2013.01); *G06T 7/50* (2017.01); *G06T 7/60* (2013.01); *B23K 2101/06* (2018.08); *G06T 2207/30164* (2013.01)

(58) Field of Classification Search
CPC .... B23K 9/164; B23K 9/0282; B23K 31/125; B23K 33/00; B23K 2101/06; G06T 7/0004; G06T 7/40; G06T 7/50; G06T 7/60; G06T 2207/30
See application file for complete search history.

(56) References Cited

U.S. PATENT DOCUMENTS

| | | | |
|---|---|---|---|
| 2015/0321280 A1* | 11/2015 | Einav | B23K 31/125 228/9 |
| 2016/0193681 A1* | 7/2016 | Pesme | B23K 9/1274 219/136 |
| 2017/0144256 A1* | 5/2017 | Tao | B23K 9/0282 |
| 2017/0182605 A1* | 6/2017 | Rajagopalan | B23K 9/32 |
| 2018/0001422 A1 | 1/2018 | Rajagopalan et al. | |
| 2018/0029154 A1* | 2/2018 | Rajagopalan | B23K 9/0286 |

FOREIGN PATENT DOCUMENTS

| | | |
|---|---|---|
| CN | 103801796 A | 5/2014 |
| CN | 104416305 A | 3/2015 |
| CN | 204893185 U | 12/2015 |
| CN | 109429490 A | 3/2019 |
| EP | 0852984 A1 | 7/1998 |
| EP | 2543460 A1 | 9/2013 |
| JP | 2019-048309 A | 3/2019 |

* cited by examiner

ORBITAL WELDING OF PIPES AND PIPE SEGMENTS

CROSS REFERENCE TO RELATED APPLICATIONS

This application claims priority to U.S. Provisional Application No. 63/044,362 entitled "ORBITAL WELDING OF PIPES AND PIPE SEGMENTS" filed Jun. 26, 2020. The content of this application are incorporated by reference into this application in its entirety.

TECHNICAL FIELD OF THE INVENTION

The present invention pertains to Orbital welding. In particular, the present invention pertains to apparatus and method for welding pipes or pipe segments together based on scanning and analysis of seam topography, positioning and leveling their interfacing surfaces relative to each other, pre-scanning and mapping these surfaces and filling any gap created between them with a welding material based on the scanning and mapping results.

BACKGROUND OF THE INVENTION

Welding is a well-established process for joining metal parts. In particular, welding is imperative for overlaying pipelines that stretch along significant distances and/or that stream fluids, liquids or gases. Such pipelines are made of a plurality of segments of pipe that connect one to the other and form a hermetically sealed inner volume. Ensuring that not any leakage occurs from the pipeline requires that the connection areas between every two segments are sealed and completely filled with a welding material. To ensure this the pipe segments should level one relative to the other as much as possible and the welding material should fit the topography of the interfacing surfaces of the pipe segments and their relative positioning one to the other.

Currently, forming pipelines by welding pipe segments together relies mainly on the skills, experience and knowledge of a human expert. Decision making on how to proceed with welding is made at the construction site of the pipeline using the naked-eye observation of the supervising expert. The expert supervises the positioning and leveling of the segments one relative the other, continuously identifies the topography of the surfaces of the pipe segments as the welding progresses, and manually guides a welding device inside the seam between the surfaces. The disadvantages are mainly due to substantial reliance on human expertise and labor. Such method includes expensive manual labor-based work, strong dependence on human expertise and personal knowledge and intuitive decision-making onsite how to position the pipes relative to each other and how much and where to weld them together. The severity of a not hermetically welded pipeline impacts its entire operation and may lead to complete halt of streaming fluids through it. Further, repairing will be required under non-ideal or even impossible conditions and might even turn impossible.

Welding devices and apparatuses are known in the field of welding pipes or any two metallic surfaces. WO 2013/076541, which is assigned to the applicant of the present application, describes and claims a modular welding apparatus with a welding device which is carried over a traveling unit for travelling on curved surfaces such as those of pipes and welding interface surfaces between every two pipe segments. The welding device as described and depicted in WO 2013/076541 is incorporated herein by reference. However, it is integrated into the apparatus of the present invention for orbital welding that requires different pre-scanning method and apparatus as detailed below.

It is, therefore, an object of the present invention to provide an apparatus for Orbital welding that replaces the current human and manual welding method of pipelines and current mechanical apparatuses and methods.

It is yet another object of the present invention to provide an apparatus for Orbital welding that comprises scanning devices and techniques for pre-scanning and mapping the topography of interfacing surfaces of pipe segments before and during welding.

It is yet another object of the present invention to provide an apparatus and method for Orbital welding wherein the welding is done in repeatable closed paths, where such paths comprise, inter alia, oscillation paths, orbital paths, zigzag paths and lazy eight paths.

It is yet another object of the present invention to provide a synchronized apparatus and method that synchronizes between scanning and mapping pipes interfacing surfaces and welding and advancing the welding apparatus along the interface seam between neighbor pipe segments.

This and other objects and aspects of the invention shall become apparent as the description proceeds.

SUMMARY OF THE INVENTION

In one aspect, the present invention provides novel platforms for Orbital welding, using pre-scanning techniques. Orbital welding is normally used for connecting metal pipes, where the welding process comprises the following stages:
Preparation that Comprises:
  Placing the end surfaces of every two pipes or pipe segments in a way that they touch each other;
  Positioning, leveling and fitting between two pipes/pipe segments and preparing them for a welding joint;
  Identifying a welding joint profile that may be U or V shaped along the connecting line between the two pipes.
  It should be noted that the profile shape of the seam at the interfaces between the surfaces of every two pipe or pipe segments can have different angles depending on the thickness of the pipes' walls and material. Further, the seam curving is not fully accurate and can vary between pipes. In addition, there are also variations between pipes dimensions, which can cause misalignment areas along the circumference of the joint. For example, one pipe in a certain area can be higher than the parallel area in the other pipe.
Welding that Comprises:
  A welding process that may be selected from GMAW (Gas Metal Arc Welding), MAG (Metal Active Gas), MIG (Metal Inert Gas), Pulsed MIG, RMD (Regulated Metal Deposition) and FCAW (Flux Core Arc Welding);
  Placing a welding tip automatically at the center of a joint between the interfacing surfaces of the two pipes and in pre-defined height from their bottom;
  Applying welding in layers starting from a root layer, then hot pass, filling (as necessary) and finally capping;
  The number of welding layers depends on the wall thickness.
  As the seam becomes wider the welding may involve oscillation, which may be in typical ∞ ('lazy eight') or zigzag movements. The Orbital mode of welding, including the oscillation mode, enables the welding device to fill the seam between the pipes/pipe segments in a layered method from bottom to top of the seam. Especially, such oscillation mode allows a spatially even distribution and layering of the welding material as the welding process advances from the root welding layer at the bottom to the capping at the top of the seam. As the welding unit operates in an oscillating mode, the scanner unit adapts to such mode to provide the data processor the correct instantaneous image of the seam section to be welded. Accordingly, the controller issues the correct commands to the welding unit to orbit in the correct path until completing the welding of any particular layer at any distance from the bottom of the seam. It should be noted that any type of closed loop path is encompassed in the oscillation mode.

Further, the controller is configured to monitor, supervise and control the welding and issue commands to the welding unit to optimize the welding at any local section, area, spot or point on the interfacing surfaces of the pipes/pipe segments and between them in real-time. In the welding process, the scanner welding unit scans any such particular section, area, spot or point and at any given stage and transmits related images to the processor unit. The processor unit analyzes the images, for example with image analysis software, and produces current state of the local weld. A comparative analysis based on welding history archive, may also be incorporated to determine if this local weld has reached optimal result or further welding actions are required. The controller then navigates the welding and scanner welding units to make further passes over the welding area to complete the local welding, for example by adding weld material in voids or enclosures left in the seam, which are deficient of the material or scraping superfluous weld material.

Inspection that Comprises:

In some cases, mobile X-ray imaging means is used for inspection the welding quality;

Otherwise, inspection can be done using visual inspection or mobile ultrasonic wave means.

Additional means to test the sealing of the welded seam can be hydrostatic measurements that check leakage out of the connecting line when applying pressure inside the pipes. In some cases, the leakage check is done using hydrostatic pressure measurements In one particular embodiment, the orbital movement of the welding device may be done on a rail. In another particular embodiment, the welding process is normally done using two or more welding devices/traveling units that work together. In still another embodiment, the welding quality is measured after every welding process.

In one aspect, the present invention provides an Orbital welding device for welding a seam, which is formed at the interface between parallel surfaces. In particular, such device comprises: a welding scanner unit, a control unit and a welding unit.

In some embodiments, the control unit also controls the servo robotic system that moves the welding unit and the welding tip.

In one particular embodiment, the control unit gets the scanning information and based on the scanner information controls the position and orientation of the welding tip. The control unit may also control the welding parameters. Such parameters may be or relate to the welding tip movement speed, location of the welding tip in the seam, movement/oscillation of the welding tip, oscillation frequency and amount of welding material flow.

In one embodiment, the Orbital welding scanner unit is configured to do the following operations:

The scanner scans the welding seam contour and measures textural (like rust and surface roughness) and geometrical parameters.

The scanner can be used before, during and after Orbital welding procedure.

The scanner can detect abnormal cases of the welding seam.

The scanner enables to optimize the relative position, leveling and orientation of the pipes to each other in pre-welding scanning, when abnormal case is detected before welding.

In post-welding scanning, the scanner can provide alert when an abnormal case is detected that may trigger a special welding process.

In some embodiments, the welding device includes a database of historical welding events:

For each welding event the following parameters are recorded: Time, pipes information (diameter, material, wall depth, topography), geometrical parameters (e.g., seam shape and welding angle), environmental condition (e.g., temperature, humidity), welding parameters, and welding quality (particularly, in what units we measure quality).

In some embodiments the welding angle depends on the position of the welding unit relative to the welding location In some embodiments, the control unit of the welding device uses historical welding data to set optimal welding parameters according to the current detected parameters.

Additional embodiments of the welding device comprise the following characteristics: The control unit maintains a fixed distance of the welding tip from the bottom of the seam.

In some cases the welding tip oscillates within the seam, setting horizontal oscillation amplitude (side to side) in a way that keeps a fixed distance from the seam walls at a set position of the welding tip. One way to calculate and set the amplitude given a safety distance from the walls of the pipe segments is as follows:

Amplitude=Profile width at the location of the welding tip−2*distance from the seam wall. In particular embodiments, such typical distances can be 1 mm for pulse MIG welding and 2 mm for continuous MIG.

In still another particular embodiment, the welding apparatus comprises two or more Orbital welding devices, where each of the welding devices includes a scanner unit, a control unit and a welding unit. In still another particular embodiment, the Orbital welding devices communicate with each other and exchange relevant information for the welding process. For example, the control unit of one Orbital welding device receives information (including scanning data) from the control unit of another Orbital welding device.

In one particular embodiment, when a vertical misalignment of the top edge of a pipe or pipe segment is formed and that is bigger than the set threshold, the welding device deploys more welding material on the lower side of the seam.

In still another particular embodiment, the position of the welding nozzle is determined upon measuring the width of the opening of the welding seam. In particular, the nozzle is positioned at the middle of the width of the opening as the initial point for welding.

In still another particular embodiment, the height of the welding tip controls the amount of the welding material flow according to the measured value of this height. Specifically, the height is measured from the bottom of the seam to the point where the wall profile turns flat.

In still another particular embodiment, a horizontal root gap may be created between the interfacing surfaces of the pipe segments that is greater than zero. This gap is especially formed at the bottom of the seam which is formed between surfaces that jointly form a V or U shape seam. In such case, the oscillation welding device(s) oscillates the welding nozzle in a perpendicular direction to the welding line to close the formed gap and provide a welded floor over which the seam may be further filled with the welding material.

In specific embodiment of a burn through event, where the welding process generates a hole in the welding site, the scanner may detect the event of burn through and trigger a correction operation that fill the hole or prevent the occurrence of the hole.

In one particular embodiment, the method for welding two pipes or pipe segments together further comprises the following actions:
- post-scanning and mapping the seam after completion of welding;
- transmitting scanned and mapping data of the welded seam to the processing unit;
- identifying locations and/or spots of non-optimal weld in the seam;
- travelling the robot to these locations and/or spots; and
- fixing and completing the weld in these locations and/or spots.

Non-optimal weld may comprise incomplete, deficient, flawed, unevenly distributed or superfluous welding material.

The welding method may further relate to historical data of past welding operations and plans and apply them to a currently welding project. Particular actions that apply the reference to historical data are as follows:
- storing scanning and welding related history of previous welding rounds or passes;
- retrieving this history and providing it to the processing unit;
- comparing this history to scanning data, which are obtained in a current welding project;
- identifying similarities and differences between the history of such past rounds or passes and the scanning data; and
- constructing a welding plan for the current welding of the seam based on comparison between the retrieved history and scanning data.

DETAILED DESCRIPTION OF THE INVENTION

A detailed description of the Orbital welding apparatus and method are provided in this section. The following part describes particular examples and preferred embodiments of the present invention with reference to the accompanying drawings and without limiting the scope of the present invention.

Figure 1:
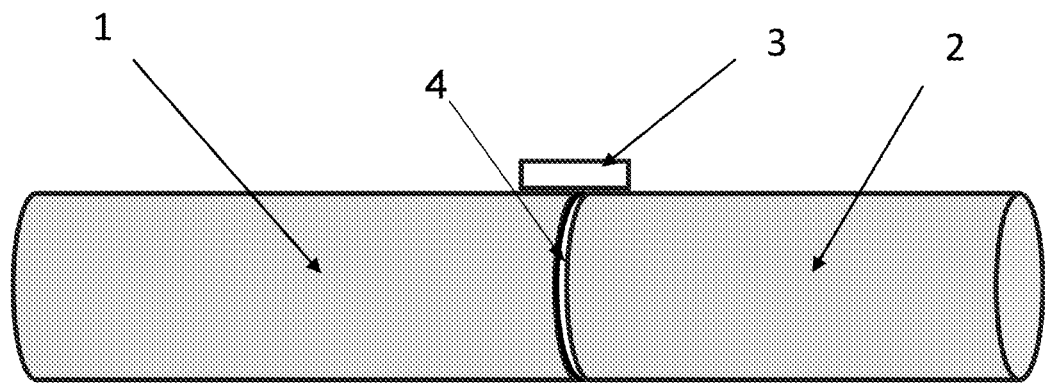
FIG. 1 illustrates a general schematic view of the welding of two pipes to each other with a welding device.
Figure 8:
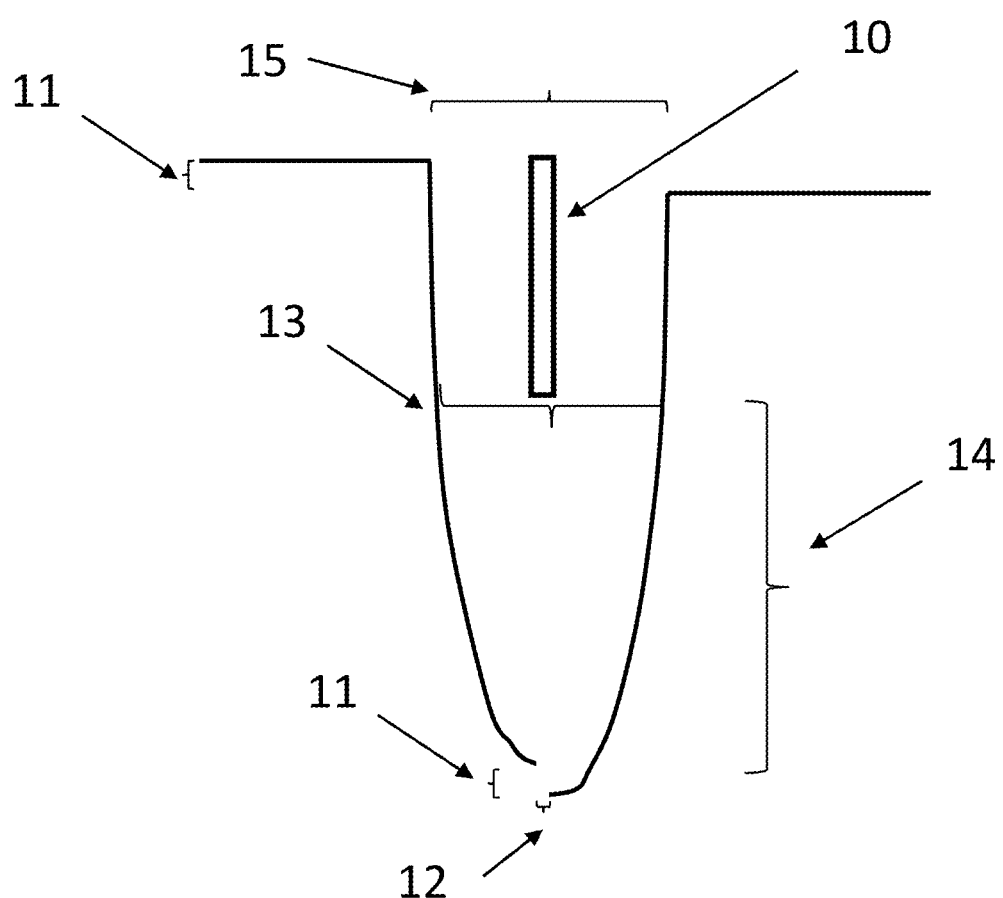
FIG. 8 illustrates schematically the different relative gaps and dimensions of the seam that are considered in the welding process.

The Orbital welding apparatus and method of the present invention are essentially adapted to meet the imperative need for hermetic welding of two interfacing pipe or pipe segments. A welding device 3 as shown in FIG. 1 is positioned over the seam 4 which is naturally formed between the interfacing surfaces of the two pipes 1 and 2. The nozzle 10 of the welding device as shown in FIG. 8 enters the seam and covers the outer walls, namely interfacing surfaces, of the welded pipes 1 and 2. FIG. 8 also demonstrates the different dimensional parameters, which are considered in Orbital welding, to reach complete sealing of the seam. These parameters are discussed later in the description.

Figure 2:
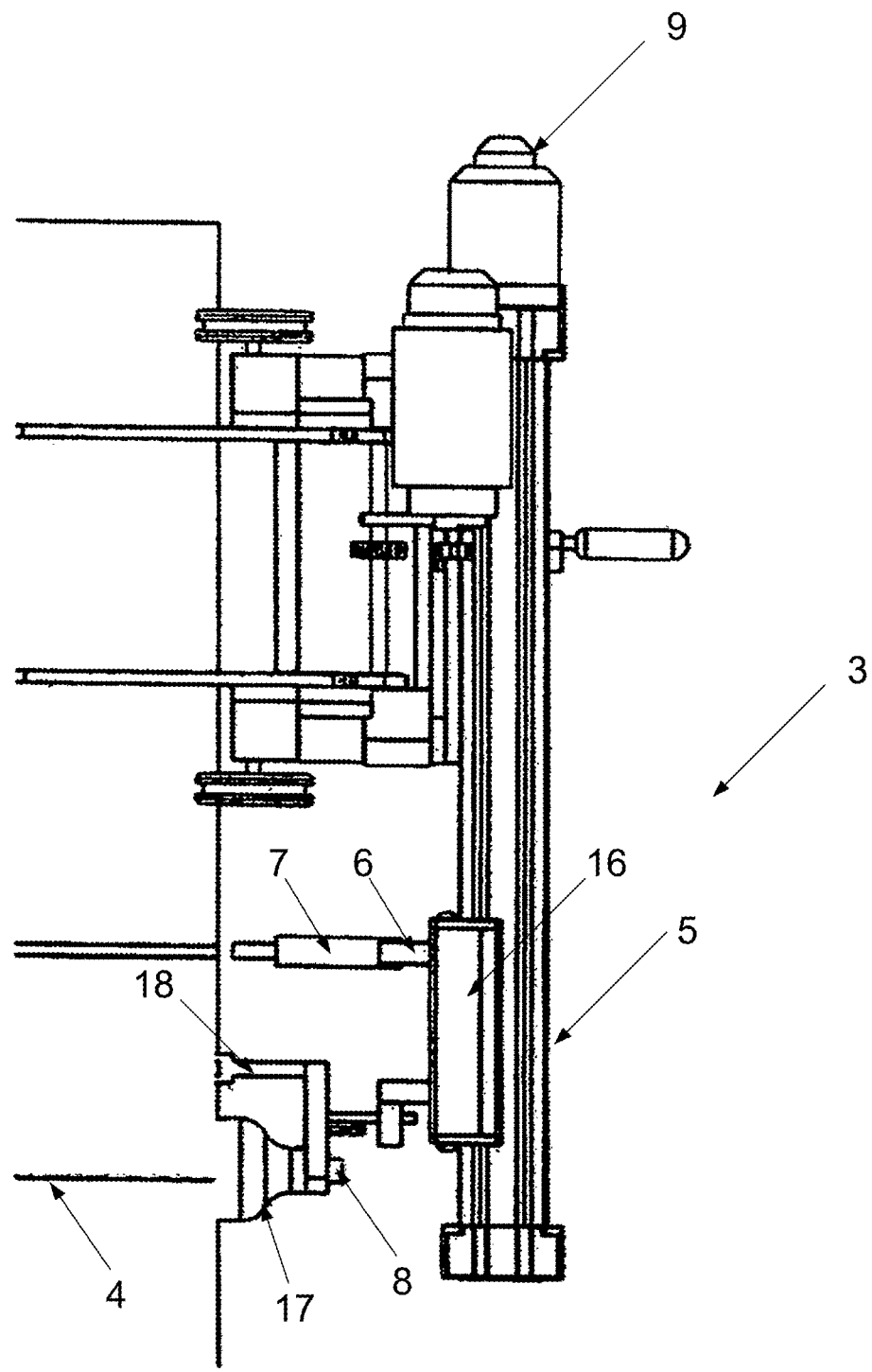
FIG. 2 illustrates an exemplary welding device.

The welding device 3 is schematically depicted in FIG. 2. The device is equipped with a linear arm 5 that is parallel to the axis of the pipe. The adjustable mechanism/moving slide 16 enables fine adjustment of the distance between the welding device 8 and the scanner 7. The welding device 8 with a welding tip 10 (see FIG. 8) travels along the opening of the seam 4 and is inserted inside the seam for hermetic sealing from bottom to top. The scanner 7 is used to track and scan the seam and provide a command (for example through a controller) to the arm 5 to adjust its position. The arm 5 is driven by a motor 9 that drives the moving slide 16. The welding device 3 may be fitted with height adjustment and control 18. A shielding device 17 provides protection to the weld tip and therefore makes possible the use of a shielding gas as known in GMAW, MAG, MIG, Pulsed MIG, RMD and FCAW.

For advancing the welding device along the seam in the welding process, a travelling unit carries the welding unit, control unit and welding scanner unit and moves them as the welding proceeds under the control and instructions of the control unit. The travelling unit may further comprise a robot for carrying the welding scanner unit, control unit and welding unit over and travelling along the surface of the pipes/pipe segments. Alternatively, the travelling unit may comprise a track or rail for carrying the welding scanner unit, control unit and welding unit over and travelling along the surface of the pipes/pipe segments.

To enable the welding scanner unit to identify its location inside the seam and guide the welding unit, it can detect a selected distance from the bottom of the seam. The welding device will then synchronize with the selected relative height of the scanner unit and maintain the welding tip at this relative height/distance.

Figure 3:
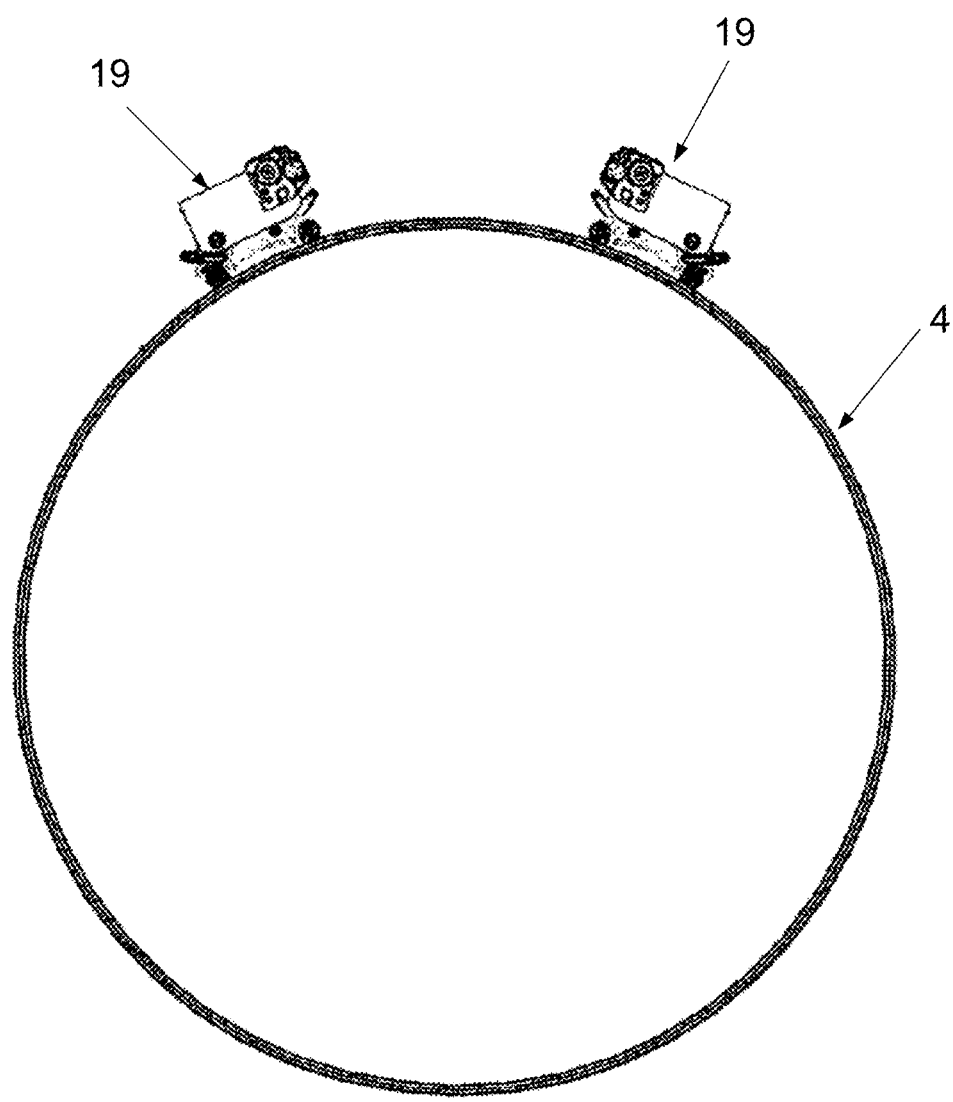
FIG. 3 illustrates an apparatus for schematic coordinated welding with two welding devices mounted on too robots at parallel locations at the welding seam.

FIG. 3 shows that the seam may be welded simultaneously with more than one welding device, which is mounted on travelling units 19 that travel along the surface of the two interfacing pipe segments and above the seam 4. Such apparatus requires that the two (or more) welding devices coordinate the welding between themselves, for example by sharing information and exchanging commands between their controls. This coordinated operation may benefit in faster welding and in a more complete sealing of the seam, since the combined scanning of the scanners on the two welding devices may better identify incomplete spots and areas within the seam that should be further filled. The welding devices may then complete such spots and areas in a combined operation. In addition, every welding device may be responsible for one side or section of the seam and the welding filling may then meet at the interfaces of the sides and/or segments.

The apparatus of two welding units may be controlled by a single control unit that simultaneously operates the two welding units to weld the seam, communicate with each other and exchange data with each other on welding of said seam. Further, such data may comprise parameters of the welding in every section which is welded by each of the welding units and scanning and mapping details of the surface and bulk of the seam in every section before, during and after completion of welding.

Figure 4:
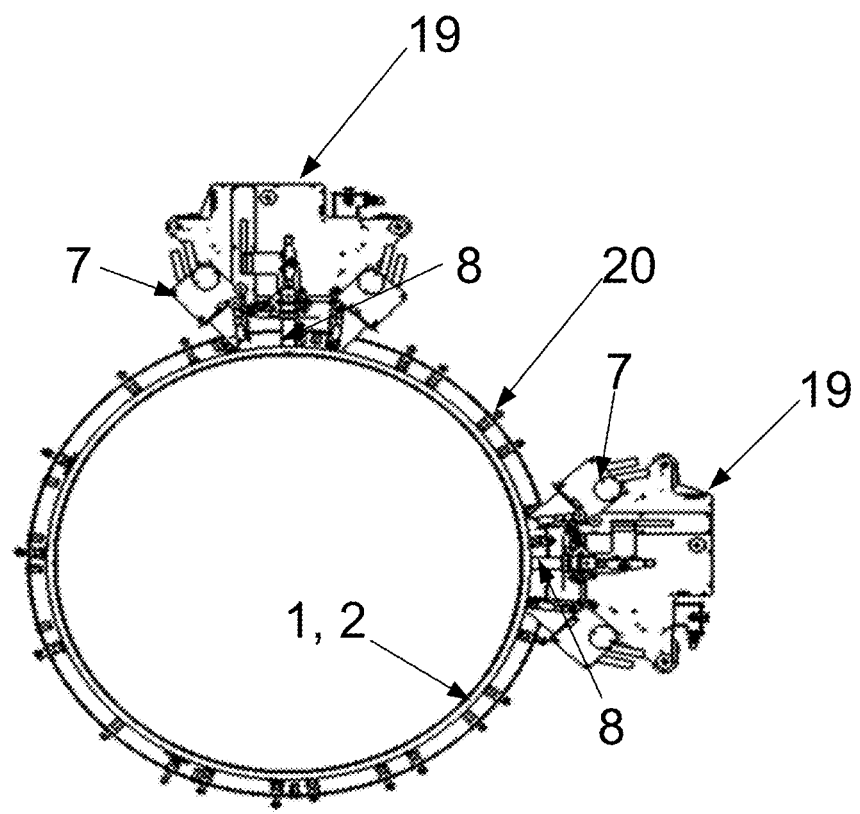
FIG. 4 illustrates an apparatus of two welding systems mounted on two traveling units that travel along a rail over the surface of the pipes near the welding seam. The travelling unit can be a robotic system that is controlled by the control unit.
Figure 6A:
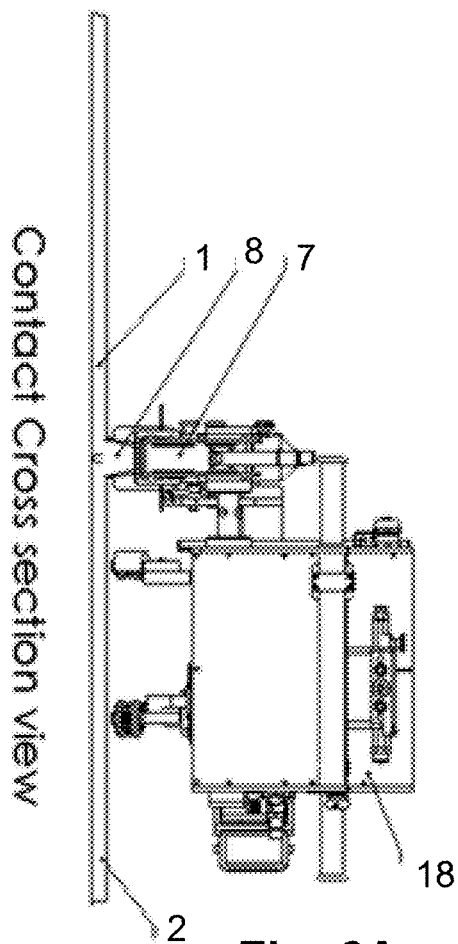
FIGS. 6A-B illustrate schematically the welding device on a robot and a travelling unit on the pipe surface in cross section view.
Figure 6B:
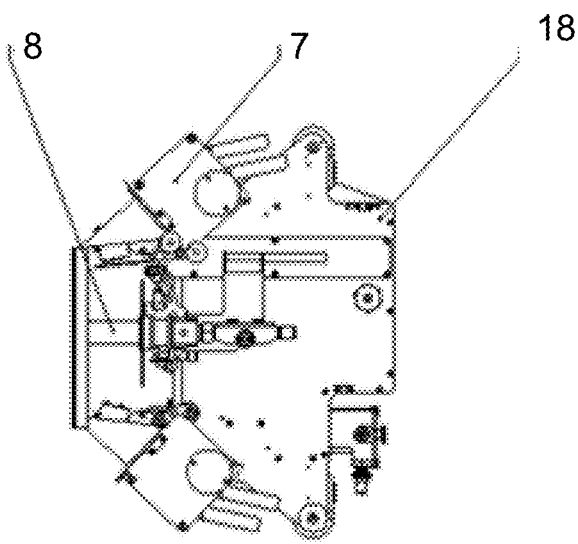

FIG. 4 illustrates means for travelling the welding apparatus over the surface of the pipe segments. In this case, two welding apparatuses are mounted each on a robot 19 and travel along a rail or carried by a chain or track 20, which are stretched on the surface of the pipes 1 and 2. A more detailed illustration of the welding apparatus is shown in FIGS. 6A-B that show the main components of the welding apparatus. A welding device ending with a welding tip 10 is located at the lower face of the apparatus and perpendicularly to the apparatus travelling route. It is so configured to introduce into the seam between the pipe interfacing surfaces to any required depth to ensure complete sealing with welding. A scanner 7 precedes the travelling path of the welding tip and scans and maps the topography and surface content of the pipes surfaces. The scanning and mapping data are transmitted to a data processor (not shown) that issues commands to the controller to navigate the welding tip to particular areas in the pipes surfaces for welding. The data processor may also issue a welding plan given a complete mapping of the surface areas of the pipes' interfaces surfaces. The welding plan may include a series of instructions for the controller to navigate the welding device and tip and advance the robot along the seam. These instructions may be based on different parameters which are collected onsite and calculation based on these parameters. For example, amounts of welding material may be pre-calculated before distributing it at different areas given the particular local topography of the surface. Other variables which are taken into account are gaps of the seam between the surface, which may be caused due to misalignment of the relative position and levelling of the two pipe segments. Such situation is schematically illustrated in FIG. 8.

In some applications of a welding plan, the scanner unit pre-scans the seam and transmits the data which are obtained from the pre-scanning to the data processing unit. Based on the data of the pre-scan, the data processing unit produces a mapping of the surface of the seam and a welding plan before initiating the welding. The control unit then executes the welding plan by controlling the operation of the welding device. For example, the control unit commands the welding unit to distribute the amount of welding material, which is required for every section of the seam, to obtain a solid and continuous weld. In another embodiment, the scanner unit scans the most recently welded section to identify flaws in the weld. The scanner unit then passes the scanned data to the processing unit and the processing unit updates the welding plan with post-welding pass to complete the welding. The control unit then commands the welding device to travel to the flawed sections and complete the welding process.

FIG. 8 illustrates and exemplifies a misalignment in the positioning and levelling of two pipes or pipe segments at the interface one relative to the other. Absolute accuracy in this relative positioning rarely occurs in practice and even small differences in the relative height of the pipe/pipe segments will produce vertical and horizontal open gaps at the at the top and bottom areas of the seam which is created between the parallel surfaces of the pipes/pipe segments. In particular, the relative non-levelling of the two interfacing surfaces of the pipes/pipe segments creates a vertical height difference 11 at the bottom of the seam, and is a potential hazard for leakage, which are streamed through the pipeline. A horizontal relative dislocation 12 of the pipes at the bottom of seam may also be caused due such non-levelling and should also be completely sealed to prevent leakage (lack of fusion, discontinuity in the weld the reject the weld and this area need to be repaired). To enable this, the scanner (not shown in FIG. 8) of the welding apparatus of the present invention travels within the seam along its entire length and width and identifies mismatches and discontinuities of pipe surface. The data are transmitted to a unit processor and a welding plan instructs the welding device to travel its tip 10 towards the identified gap to seal it with a welding material.

The relative misalignment of the two pipes simultaneously creates bottom and top non-levelling, where the length of the vertical gap 11 at the top is naturally identical to the length of the vertical gap 11 at the bottom of the seam. Further, the horizontal dislocation 12 of the pipes relative to each other at the bottom of the seam expresses in widening of breadth 15 of the seam at the top, given that the grove is almost always U or V shaped. These two top gaps are considered when welding, for example in determining the height that the welding material should reach in the seam or amount of material required for a complete sealing.

The welding process starts at the bottom of the seam and proceeds up towards the edge. In any given stage of the welding process, a core with a height 14 is formed up to a selected level 13. These height and level are determined by the location of the welding tip 10 that sticks out of the welding device into the seam. As described with reference to FIG. 2, the welding device 3 may adjust the height of the tip 10 within the seam with a height adjustment mechanism 18 and dynamically advance up the seam in the welding process.

Figure 7:
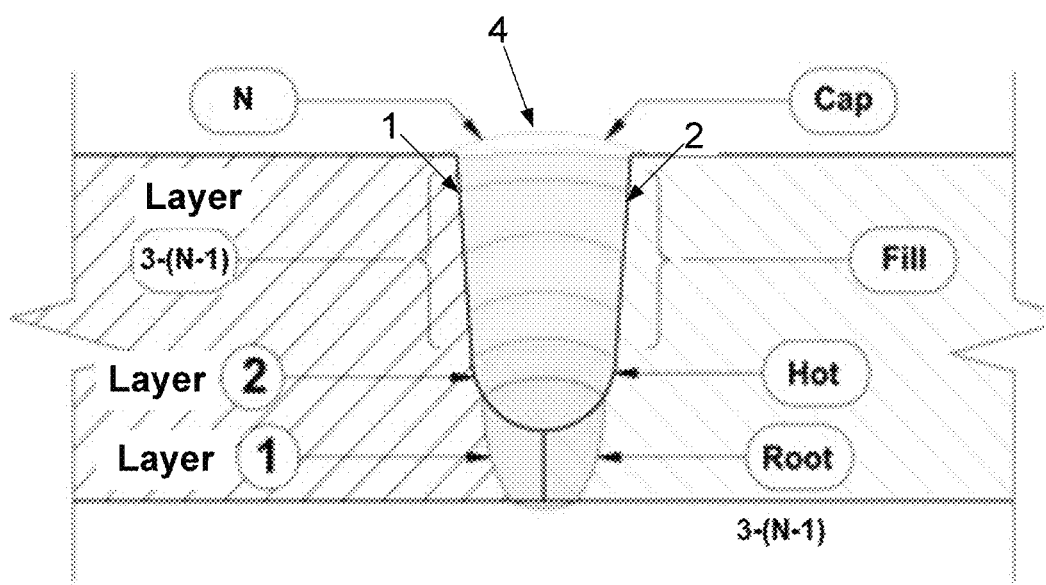
FIG. 7 illustrates schematically the progression of welding in the welded seam between the two pipes.

FIG. 7 is a schematic illustration of the stages of welding and the layers which are formed in the seam between the pipes/pipe segments. Layer 1 is the root layer that seals the bottom of the seam and is used as a base to overlay the upper welding layers. Layer 2 represents the layer which is currently overlaid as the welding progresses and is, therefore, always hot. As FIG. 7 shows, the welding process advances up the seam 4 in spreading layers one over the other. Accordingly, the fill above Layer 2 is divided to a number of layers, depending on different parameters as depth and width of the seam, vertical and horizontal relative misalignment of the pipes/pipe segments and topography of the surfaces of the pipes/pipe segments. A welding plan, which may be generated according to these parameters, may include the number of passes that the welding tip should do inside the seam for complete fill and sealing. As a result, such plan will also determine the total number of layers, and in particular the number of layers in the fill above Layer 2. Given a top Cap layer as FIG. 7 shows and setting the total number of layer to N, then the number of layers in the fill above Layer 2 will be 3–(N–1). The Cap layer in particular is the layer that seals the welded seam, and has a thickness that mounts above the upper edges of the pipes/pipe segments. This is done to ensure that the welding is secured and provide hermetic sealing, the continuity of the pipes bulk and homogenous distribution of stresses along the pipeline.

Figure 5:
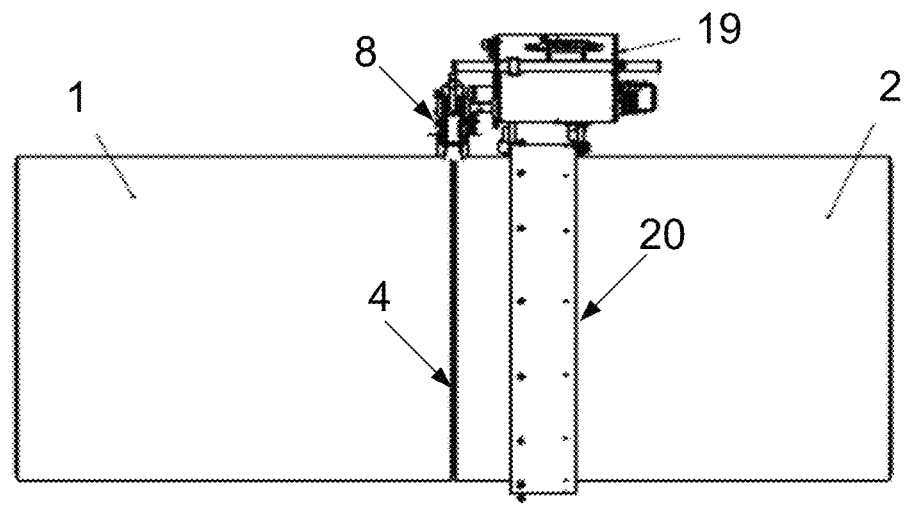
FIG. 5 illustrates schematic front view of the welding apparatus with a welding device mounted on a travelling unit that travels along a rail on the surface of the pipes.

FIG. 5 is a schematic illustration of the welding apparatus mounted on a traveling unit 19 that travels along a rail (welding band) 20 that surrounds the surface of the one of the pipes. The rail is located on the pipe at a distance that places the welding device 8 including its tip and scanner above the seam between the two pipes/pipe segments and in a position that enables the tip and scanner to introduce into the seam for scanning the topography of the surfaces, level and advancement of welding and welding. The welding device 8 with its scanner and tip travels with the travelling unit around the pipes and inside the seam 4. The rate of travelling the travelling unit and welding device depends on the rate of progress of welding. A processing unit may produce a welding plan based on the data received from the scanner and accordingly set the rate of welding depending on the local characteristics of any section of the seam that is currently welded. A welding plan may also provide an integrated perspective of the welded seam and ensure a solid and continuous welding around avoiding defects as pores, cavities, lack of fusion and air bubbles inside the weld, little filling of material at local areas and incomplete capping at the top and hermetic filling at the root.

The invention claimed is:

1. An apparatus for Orbital welding of pipes or pipe segments together comprising:
   a welding scanner unit;
   a control unit;
   a data processing unit; and
   at least one welding unit,
   wherein the welding scanner unit is configured to scan and map contour and topography of a seam between interfacing surfaces of the pipes/pipe segments, measure textural and geometrical characteristics of the interfacing surfaces, scan and detect abnormalities in the seam, optimize pipe position, levelling and/or orientation in pre-welding scanning, provide said data processing unit with correct instantaneous image of a section of said seam to be welded and alert on abnormalities in post-welding scanning and detecting and trigger a correction operation, post-scan and map said seam after completion of welding and transmit scanned and mapping data of the welded seam to said data processing unit,
   wherein the data processing unit is configured to analyze seam topography based on scanning data from said welding scanner unit, retrieve historical data of past welding operations and plans, comparing and applying them to a currently welding project, and command said welding unit(s) to optimize welding of the seam,
   wherein said control unit is configured to command said welding unit(s) to optimize welding of the seam,
   wherein said orbital welding comprises laying root layer, hot pass layer top layers and capping externally to said pipes or pipe segments around circumference of said pipes or pipe segments according to a welding profile.

2. The apparatus according to claim 1, further comprising a travelling unit for carrying over and moving said welding unit, control unit, data processing unit and welding scanner unit.

3. The apparatus according to claim 1, wherein said textural and geometrical parameters comprise: rust, surface roughness, surface topography, seam width and depth and alignment, positioning and levelling mismatches of the pipes/pipe segments relative each other.

4. The apparatus according to claim 3, wherein the alignment, positioning and levelling mismatches comprise vertical misalignment and horizontal translocation of the pipes/pipe segments relative each other.

5. The apparatus according to claim 4, wherein said welding unit comprises:
   a linear arm that is parallel to the axis of the pipes/pipe segments;
   a moving slide attached to the linear arm;
   a motor for moving the moving slide along the linear arm;
   an adjustable mechanism that is configured for fine adjustment of a distance between a welding device and the scanner;
   a welding device comprising a welding tip, wherein the welding tip is configured to travel along the opening of the seam and be inserted inside the seam for hermetic sealing from bottom to top; and
   a height adjustment and control means for fitting the welding device to the seam.

6. The apparatus according to claim 5, wherein said welding unit further comprising a shielding device for protecting the weld tip and shielding from gas.

7. The apparatus according to claim 2, wherein the travelling unit further comprises a robot for carrying the welding scanner unit, control unit and welding unit over and travelling along the surface of the pipes/pipe segments.

8. The apparatus according to claim 2, wherein the welding unit further comprises a travelling unit and a track or rail for carrying the welding scanner unit, control unit and welding unit over and travelling along the surface of the pipes/pipe segments.

9. The apparatus according to claim 1, wherein the welding unit is configured for welding in a method selected from GMAW, MAG, MIG, MIG Pulsed, RMD and FCAW.

10. The apparatus according to claim 1, wherein the control unit comprises a controller and a data processing unit, wherein the data processing unit is configured to receive data on the seam, interfacing surfaces of the pipes/pipe segments and relative positioning, levelling and alignment of the pipes/segments and produce a welding plan, wherein the controller controls the welding scanner unit and welding unit in scanning the seam and surfaces and executing the welding plan, wherein the data processing unit is configured to receive the scanning data, analyze said data, determine whether local weld has reached optimal result, identify local areas, spots or points deficient or superfluous of weld material and navigate in real-time the welding unit(s) and welding scanner unit to make further passes over said areas, spots or points to complete welding by adding or scraping off said weld material.

11. The apparatus according to claim 10, wherein said welding scanner unit is configured to pre-scan said seam and transmit data obtained from pre-scanning to the data processing unit, wherein said data processing unit produces a mapping of a surface of said seam and a welding plan before initiation of welding.

12. The apparatus according to claim 10, wherein the welding plan comprises layered welding of the pipes/pipe segments from bottom up to the upper edges of the seam, overlaying a root layer, a second layer above the root layer, a plurality of layers above the second layer and a capping layer above the upper edges of the pipes/pipe segments.

13. The apparatus according to claim 1 comprising two welding units, said welding units are controlled by said control unit, said control unit is configured to simultaneously operate said welding units to weld said seam, communicate with each other and exchange data with each other on welding of said seam.

14. The apparatus according to claim 13, wherein said data comprises parameters of said welding in every section which is welded by each of said welding units and scanning and mapping details of surface and bulk of said seam in every section before, during and after completion of said welding.

15. The apparatus according to claim 1, wherein the Orbital welding is a closed loop welding.

16. The apparatus according to claim 15, wherein the closed loop welding comprises orbital welding, zigzag welding and lazy eight welding.

17. A method for Orbital welding of pipes or pipe segments together comprising:
   providing a welding apparatus comprising a welding scanner unit, a control unit, a data processing unit and a welding unit;
   providing two pipes/pipe segments;
   interfacing cylindrical surfaces of the pipes/pipe segments in close proximity one to the other;
   positioning, aligning and levelling the pipes/pipe segments one relative each other;
   scanning and mapping with the welding scanner unit the contour of a seam which is formed between the interfacing surfaces of the pipes/pipe segments and textural and geometrical parameters of the interfacing surfaces of the pipes/pipe profiles;
   measuring textural and geometrical characteristics of the interfacing surfaces;
   scanning and detecting abnormalities in the seam;
   optimizing pipe position, levelling and/or orientation in pre-welding scanning, providing said data processing unit with correct instantaneous image of a section of said seam to be welded, and alerting on abnormalities in post-welding scanning and detecting and triggering a correction operation, post-scanning and mapping said seam after completion of welding and transmitting scanned and mapping data of the welded seam to said data processing unit;
   analyzing seam topography with said data processing unit based on scanning data from said welding scanner unit, retrieving historical data of past welding operations and plans, comparing and applying them to a currently welding project, and commanding said welding unit(s) to optimize welding of the seam;
   introducing a welding tip of the welding unit into the seam;
   and welding the pipes/pipe segments to each other by introducing a welding material root layer at the from bottom of the seam up hot pass and top layers and capping at to the upper edge of the seam externally to said pipes or pipe segments around circumference of said pipes or pipe segments according to a welding profile.

18. The method according to claim 17, further comprising:
   post-scanning and mapping said seam after completion of welding;
   transmitting scanned and mapping data of said welded seam to said processing unit;
   identifying locations and/or spots of non-optimal weld in said seam;
   travelling said robot to said locations and/or spots; and
   fixing and completing said weld in said locations and/or spots.

19. The method according to claim 17, wherein said welding comprises;
   overlaying said root layer at bottom of said seam;
   overlaying a second hot layer above said root layer;
   overlaying a plurality of layers for filling said seam above said second layer up to the upper edge of the seam; and
   overlaying a capping layer above the upper edge of the seam.

20. The method according to claim 18, further comprising:
   detecting mismatches in position, alignment and levelling of the pipes/pipe segments relative to each other;
   identifying roughness, topography and content of the interfacing surfaces of the pipes/pipe segments; and
   positioning, aligning and levelling the pipes/pipe segments relative each other if detecting pre-welding and alerting on the mismatched if detected post-welding.

* * * * *